(12) United States Patent
Welch

(10) Patent No.: US 9,837,802 B1
(45) Date of Patent: Dec. 5, 2017

(54) CABLE GUIDE

(71) Applicant: Lee D. Welch, Springfield, IL (US)

(72) Inventor: Lee D. Welch, Springfield, IL (US)

(73) Assignee: Cable Glydz, LLC, Springfield, IL (US)

( * ) Notice: Subject to any disclaimer, the term of this patent is extended or adjusted under 35 U.S.C. 154(b) by 65 days.

(21) Appl. No.: 14/860,846

(22) Filed: Sep. 22, 2015

Related U.S. Application Data

(60) Provisional application No. 62/054,575, filed on Sep. 24, 2014.

(51) Int. Cl.
*H02G 3/04* (2006.01)
*H02G 1/08* (2006.01)

(52) U.S. Cl.
CPC .................... *H02G 1/08* (2013.01)

(58) Field of Classification Search
CPC .......... H02G 3/0616; H02G 3/00; H02G 3/02; H02G 3/32; H02G 3/30; F16L 3/22; F16L 3/221; F16L 3/222; F16L 3/12; F16L 7/00
USPC ...... 174/135, 68.1, 68.3, 72 A, 40 CC, 88 R, 174/95; 248/68.1, 49, 62, 74.2; D8/349, D8/354, 356
See application file for complete search history.

(56) References Cited

U.S. PATENT DOCUMENTS

| | | | |
|---|---|---|---|
| 3,092,360 A * | 6/1963 | Cook ................... | H02G 3/0616 174/153 G |
| 3,476,868 A * | 11/1969 | Williams ................. | H02G 7/12 174/146 |
| 5,027,478 A | 7/1991 | Suhr | |
| 5,027,864 A | 7/1991 | Conti et al. | |
| 5,780,773 A | 7/1998 | Wakamatsu | |
| D436,578 S | 1/2001 | Henry | |
| 6,262,371 B1 | 7/2001 | Allen | |
| 6,552,270 B1 | 4/2003 | Heacox | |
| 6,710,249 B1 | 3/2004 | Denton | |
| 7,319,802 B2 | 1/2008 | Morris | |
| D601,879 S | 10/2009 | Kim et al. | |
| 7,633,010 B2 | 12/2009 | Ayoub | |
| D648,685 S | 11/2011 | Symons | |
| 8,344,246 B2 * | 1/2013 | Lipiansky ................ | H02G 3/03 174/135 |
| 8,590,847 B2 * | 11/2013 | Guthke .................... | H02G 3/32 174/68.1 |
| D719,013 S * | 12/2014 | St. John ........................ | D8/356 |
| D763,063 S * | 8/2016 | Welch ............................ | D8/356 |
| 9,534,708 B2 * | 1/2017 | Cripps, II ............... | F16L 3/222 |
| 2007/0130760 A1 | 6/2007 | Washburn | |

* cited by examiner

*Primary Examiner* — Angel R Estrada
(74) *Attorney, Agent, or Firm* — Philip L. Bateman

(57) ABSTRACT

A cable guide has a plurality of parallel cylindrical sleeves connected together and radially distributed about a center axis. Each sleeve has open ends and a lengthwise opening of an arc of about 10 to 150 degrees extending between the open ends and running parallel to the longitudinal axis of the sleeve. The sleeves receive and hold electrically conducting cables on a spool or in a conduit.

14 Claims, 9 Drawing Sheets

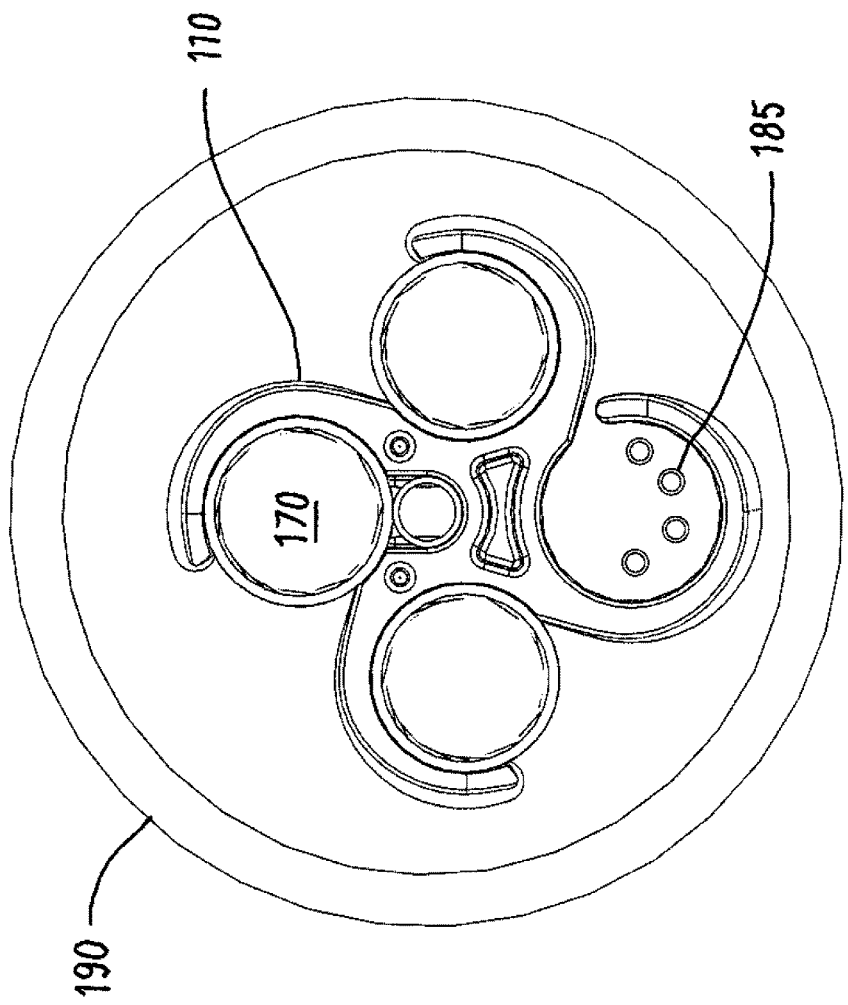
FIG. 8

CABLE GUIDE

CROSS-REFERENCE TO RELATED APPLICATION

This application claims the benefit of U.S. Provisional Application Ser. No. 62/054,575, Sep. 24, 2014.

FIELD OF THE INVENTION

This invention relates to electricity. More particularly, it relates to conducting cables in protective conduits.

BACKGROUND OF THE INVENTION

Electricity is transmitted from generating stations to electrically powered devices by metal conductors. The preferred metal is copper because of its excellent conductivity and relatively low price. The metal conductors are known as wire when they consist of a relatively small diameter single strand and are known as cable when they consist of multiple strands wound together. Both wire and cable are commonly coated with a flexible plastic insulator. Most electrically-powered devices are connected with at least three separate wires or cables, one is known as the positive, one is known as the negative or neutral, and one is a ground cable whose purpose is to carry the current to the Earth in the event of a malfunction.

On an atomic level, the flow of electricity is the movement of electrons. The movement generates friction and the friction generates heat. The diameter of the conductor must be large enough to prevent the generation of excessive heat. The minimum safe diameter of the conductor is thus a function of the voltage and current of the electricity. For example, 12 gauge (American wire gauge) copper wiring having a diameter of about 0.08 inches (about 3.2 mm) is the minimum for many residential circuits (120 volts and 20 amperes) whereas copper cable for industrial use is often one inch (about 2.5 cm) or more in diameter. Larger diameter wire and cable are typically placed onto spools at the point of manufacture and are unrolled from the spools at the point of installation.

For residential and commercial buildings, three insulated wires or cables within a plastic case are commonly used for the electrical system. For industrial applications, the wires or cables are usually installed within a metal or plastic conduit. The conduit provides additional protection and safety. The installation process typically requires the wires or cables to be unrolled from spools and then pulled through the conduit.

Pulling large diameter cables through a conduit is difficult because the cables tend to bind with each other and to rub against the inside wall of the conduit. While pulling through a straight conduit can be difficult, pulling through curved sections of conduit is even more difficult. Electricians commonly coat the cables with a solution of soapy water or other lubricant to reduce friction as they are pulled through a conduit.

A variety of conduit inserts have been disclosed. For example, Conti et al., U.S. Pat. No. 5,027,864, Jul. 2, 1991; Allen, U.S. Pat. No. 6,262,371, Jul. 17, 2001; Morris, U.S. Pat. No. 7,319,802, Jan. 15, 2008; and Washburn, U.S. Pat. Appln. Publn. No. 2007/0130760, Jun. 14, 2007, disclose conduit inserts that run the entire length of the conduit and separate individual cables within the conduit. These conduit inserts require the cables to be fed simultaneously into the inserts. It is very difficult to precisely align and then feed three or more bulky cables simultaneously into a conduit insert.

A variety of cable supports and protectors have also been disclosed. For example, Henry, U.S. Pat. No. D436,578, Jan. 23, 2001; Wakamatsu, U.S. Pat. No. 5,780,773, Jul. 14, 1998; Ayoub, U.S. Pat. No. 7,633,010, Dec. 15, 2009; and Symons, U.S. Pat. No. D648,685, Nov. 15, 2011, disclose cable supports and protectors that separate cables. However, these cable supports and protectors are not suitable for use in conduits.

A variety of circular and disc-shaped guides for cables and other flexible linear materials have also been disclosed. For example, Suhr, U.S. Pat. No. 5,027,478, Jul. 2, 1991; Heacox, U.S. Pat. No. 6,552,270, Apr. 22, 2003; Denton, U.S. Pat. No. 6,710,249, Mar. 23, 2004; and Kim et al., U.S. Pat. No. D601,879, Oct. 13, 2009, disclose guides having outwardly facing recesses arranged around a center. These guides are not suitable for use in conduits.

Accordingly, there is a demand for an improved cable guide without moving parts that enables multiple cables to be separated on a spool or in a conduit at desired intervals and that can be placed onto the cables at the point of manufacture or at the job site without requiring the cables to be fed into and through the guide.

SUMMARY OF THE INVENTION

The general object of this invention is to provide an improved cable guide without moving parts that enables multiple cables to be separated on a spool or in a conduit at desired intervals and that can be placed onto the cables without requiring the leading end of the cables to be fed into and through the guide.

I have invented an improved cable guide. The cable guide comprises four parallel cylindrical sleeves connected together and radially distributed about a center axis. Each sleeve defines a longitudinal axis and has open ends and a lengthwise opening of a constant arc of about 10 to 150 degrees extending between the open ends and running parallel to the longitudinal axis of the sleeve. The sleeves are adapted to receive and hold electrically conducting cables on a spool or in a conduit.

The cable guide of this invention has no moving parts. The cable guide enables multiple cables to be separated on a spool or in a conduit at desired intervals. The cable guide can be placed onto the cables without requiring the leading end of the cables to be fed into and through the guide.

BRIEF DESCRIPTION OF THE DRAWINGS

FIG. 8 is an end view thereof.

DETAILED DESCRIPTION OF THE INVENTION

1. Preferred Embodiment

This invention is best understood by reference to the drawings. A first preferred embodiment of the cable guide 10 of this invention is shown in FIGS. 1 to 4. The cable guide has four parallel cylindrical sleeves 20, 30, 40, and 50 connected together and radially distributed about a center axis. Each sleeve defines a longitudinal axis and has open ends. Each sleeve also has an outwardly facing opening that extends lengthwise between the open ends. The lengthwise opening runs parallel to the longitudinal axis of the sleeve. The lengthwise opening in each sleeve allows cables to be laterally inserted into the sleeves. The lengthwise opening is large enough to enable a cable to be inserted and small enough to hold the cable once inserted. As explained in detail below, cables are generally inserted into the sleeves as they are about to be pulled into a conduit. The cables and cable guide are then pulled into the conduit. At desired spacings, additional cable guides are connected. The cable guides makes it easier to pull the cables through the conduit and also maintain a separation of the cables to reduce heat.

The cable guide is made of an insulating and resilient material. The material is preferably moldable with a low coefficient of friction so that it slides easily inside a conduit. The material preferably has a melting point of at least about 140° C. (about 284° F.) so that it remains solid at the most extreme conditions and maintains structural integrity even if the electrical cables heat up or break down. Preferred materials include polyphenylene ethers, polycarbonates, and the like because of their resiliency, resistance to high temperatures, low coefficient of friction, insulating properties, hardness, and malleability. An especially preferred polyphenylene ether is NORYL EN265 resin, a commercial product of SABIC (Saudi Basic Industries Corporation). The cable guide is preferably molded as an integral unit.

The four sleeves are preferably equally spaced radially about the center axis. In other words, they are centered at the geometric azimuth positions of 0, 90, 180, and 270 degrees. These positions can alternatively be referred to as the 12, 3, 6, and 9 o'clock positions on a clock face.

Figure 2:
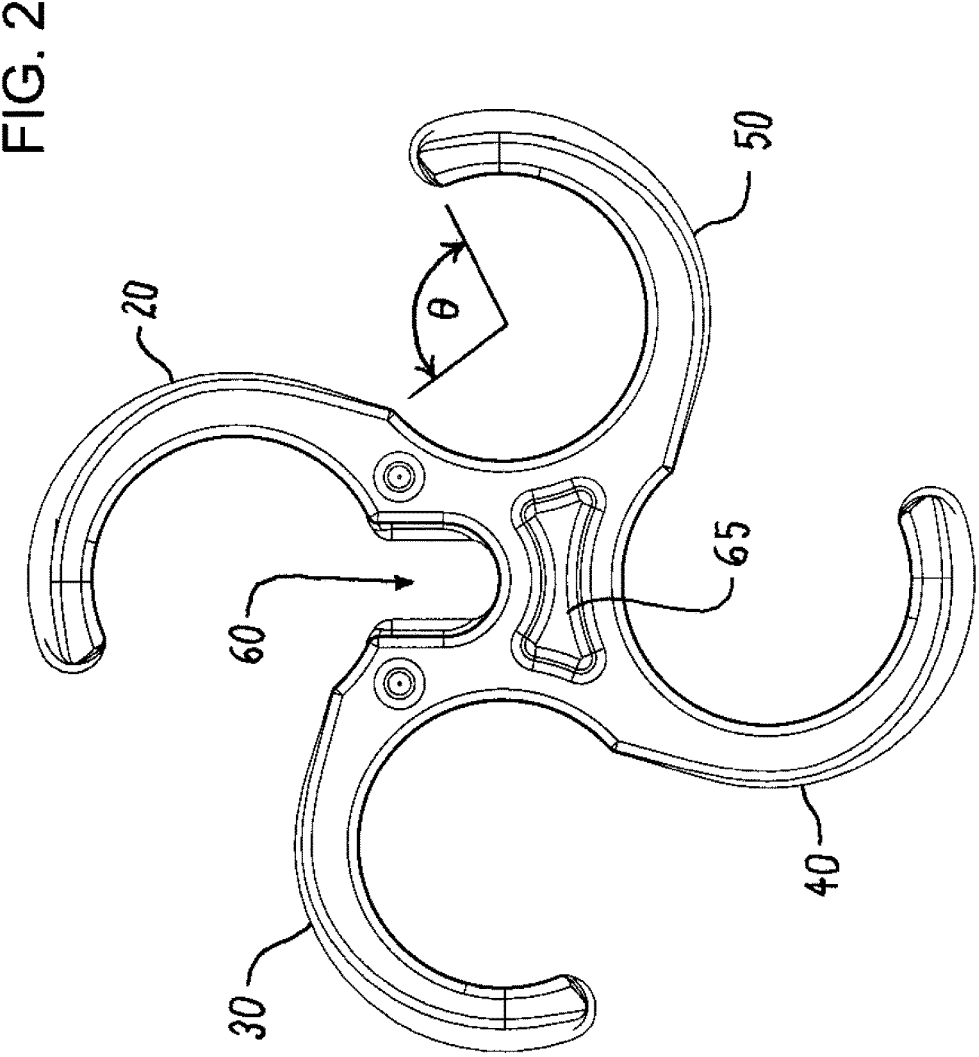
FIG. 2 is an end view thereof.

Each of the four sleeves has open ends at front and back and a lengthwise opening facing outwardly extending between the open ends. As mentioned above, the opening enables cables to be laterally inserted into the conduit. Thus, cables do not have to be fed into an open end and pulled through the sleeve. The opening is wide enough to enable a cable to be inserted into the resilient sleeves, but narrow enough to hold the cable once inserted. The arc θ of the lengthwise opening is best seen in FIG. 2. The openings for the large cables generally form an arc of about 10 to 150 degrees as viewed from an end. The openings preferably form an arc of about 80 to 120 degrees. The arcs are preferably constant from end to end.

Figure 4:
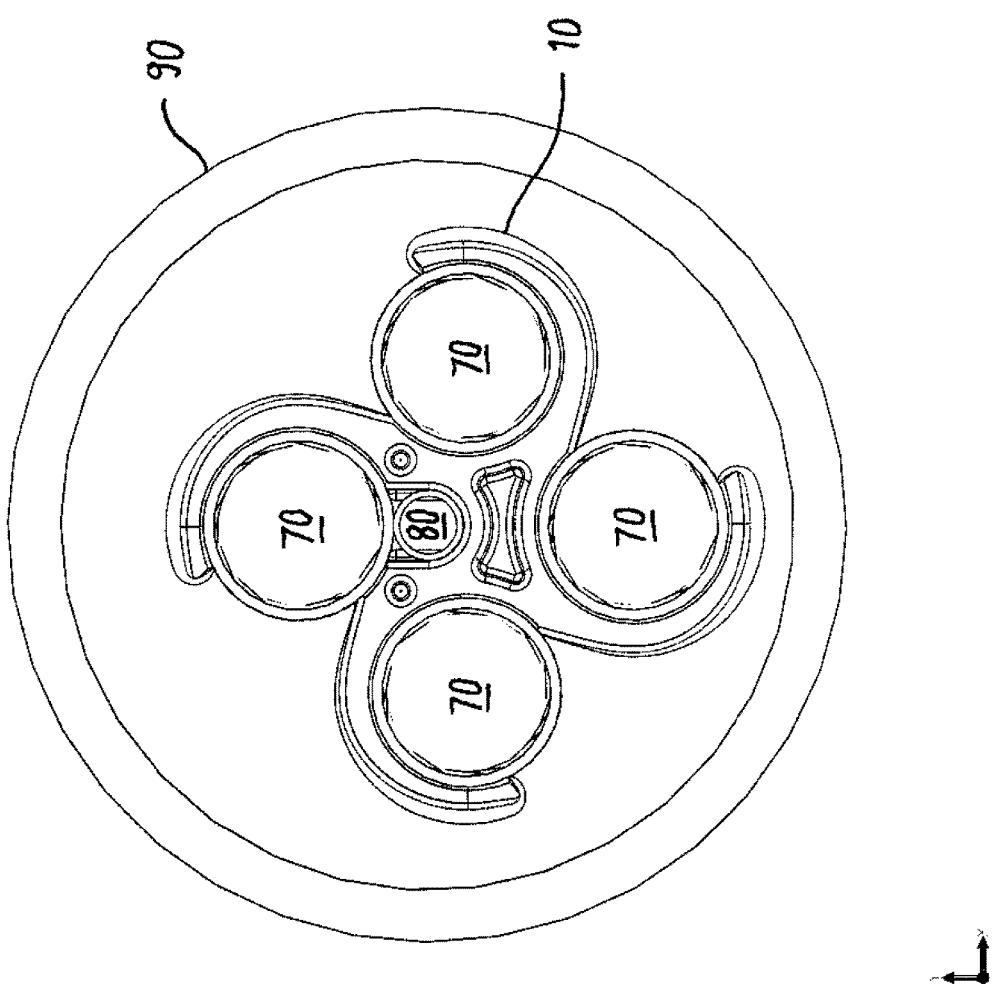
FIG. 4 is an end view thereof.
Figure 5:
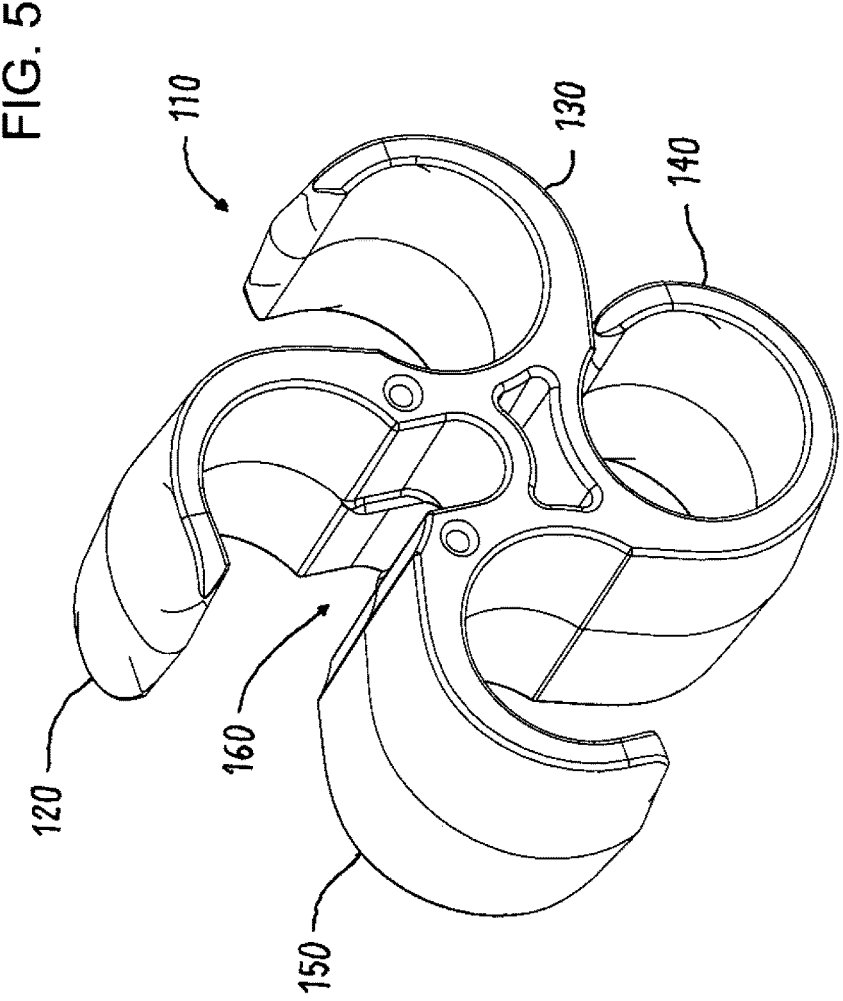
FIG. 5 is perspective view of a second embodiment of the cable guide of this invention.
Figure 6:
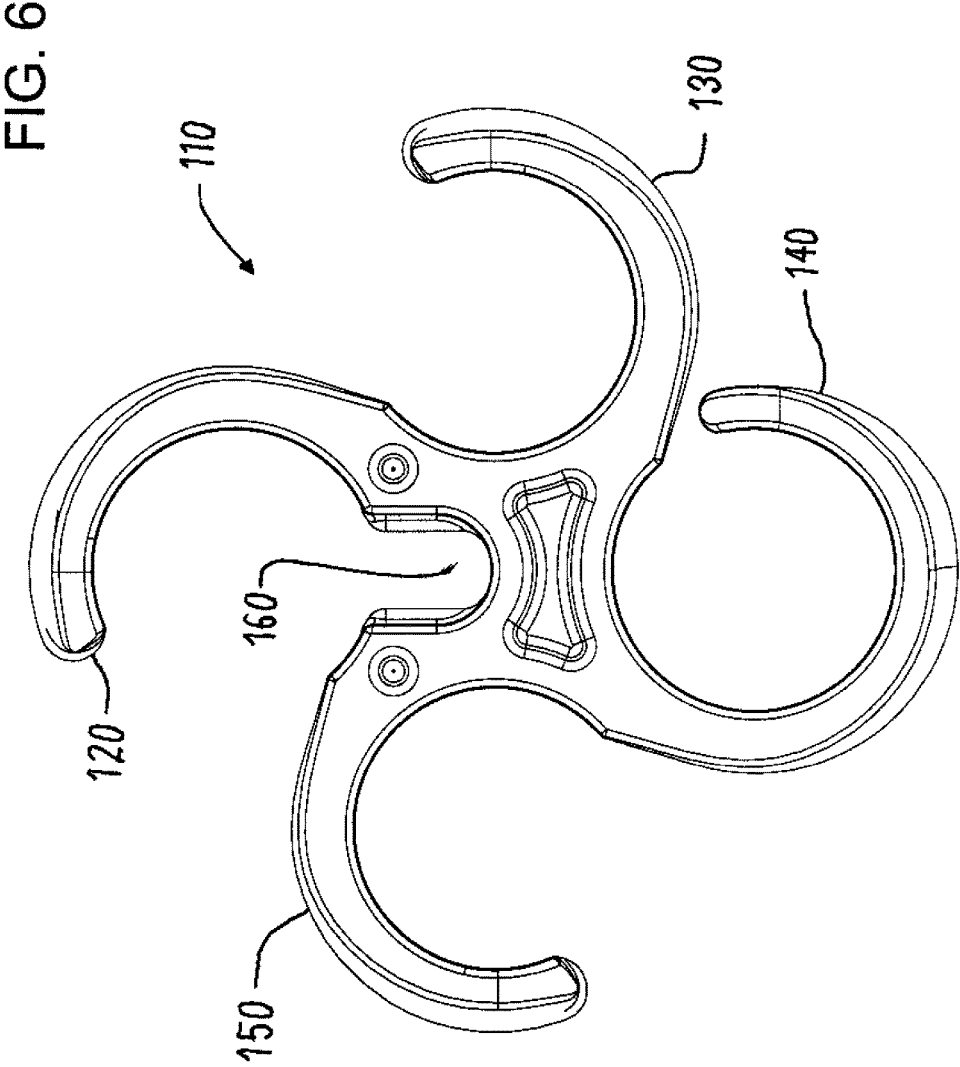
FIG. 6 is an end view thereof.

The first preferred embodiment also contains a fifth opening 60 that is centrally located and smaller in diameter than the four sleeves. As discussed below, the fifth opening is useful for holding a medium diameter cable or multiple smaller diameter control wires for control or grounding purposes when four large diameter cables are used in a conduit. As best seen in FIG. 4, the cable and wires in the fifth opening are held in place by the large diameter cable 70 in sleeve 20.

The size of the cable guide is determined by the cables and conduit with which it will be used. The diameters of the sleeves are preferably about equal to or slightly smaller than the diameters of the cables. The outer diameter of the cable guide is less than the inner diameter of the conduit into which it will be inserted. The diameter of the cable guide is preferably about 50 to 85 percent of the inner diameter of the conduit. The depth of the cable guide (from front end to rear end) is generally about one-half to one and one-half inches, and is preferably about three-fourths to one inch. If the depth of the cable guide is too little, the sleeves are prone to failure. If the depth of the cable guide is too great, cost is increased without any corresponding improvement in functioning.

The thickness of the sleeves is generally about one-sixteenth to one-eighth inches. If the sleeves are too thin, they are prone to breaking. If the sleeves are too thick, they are not resilient enough to bend to accommodate the insertion of a cable. The sleeve thickness can be relatively constant or, if desired, can taper slightly from its proximate end to its distal end. The first preferred embodiment of the cable guide contains a central bore 65 to reduce the amount of material and the cost.

Figure 1:
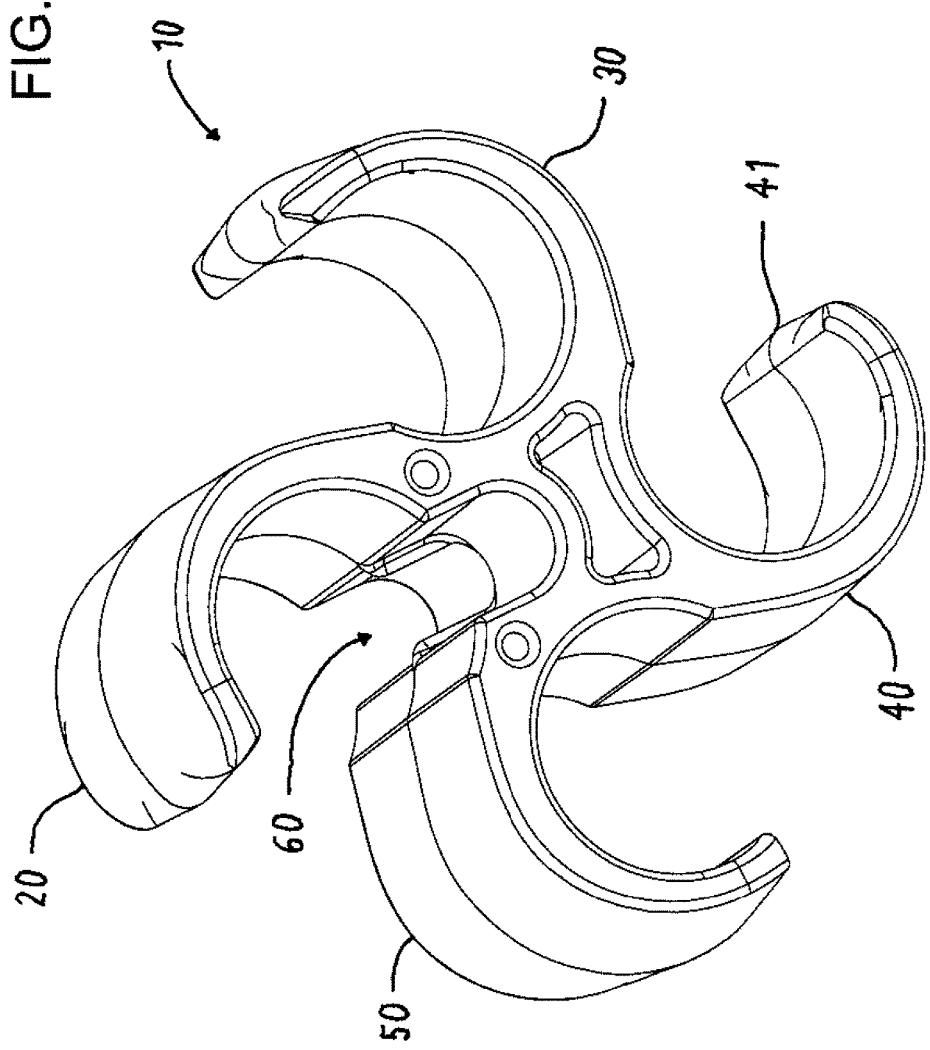
FIG. 1 is a perspective view of a first embodiment of the cable guide of this invention.

The outer surfaces of the sleeves preferably include a ridge the runs transverse to the longitudinal axis of the sleeve. For example, ridge 41 on sleeve 40 is best seen in FIG. 1. The ridges reduce the surface area of contact with the conduit and therefore reduces friction and reduces the force needed to pull the cables and cable guides through a conduit. If desired, the outer surface of the sleeve is relatively flat or contains knobs or other protuberances that reduce friction between the cable guide and the inner wall of the conduit.

2. Use

Figure 3:
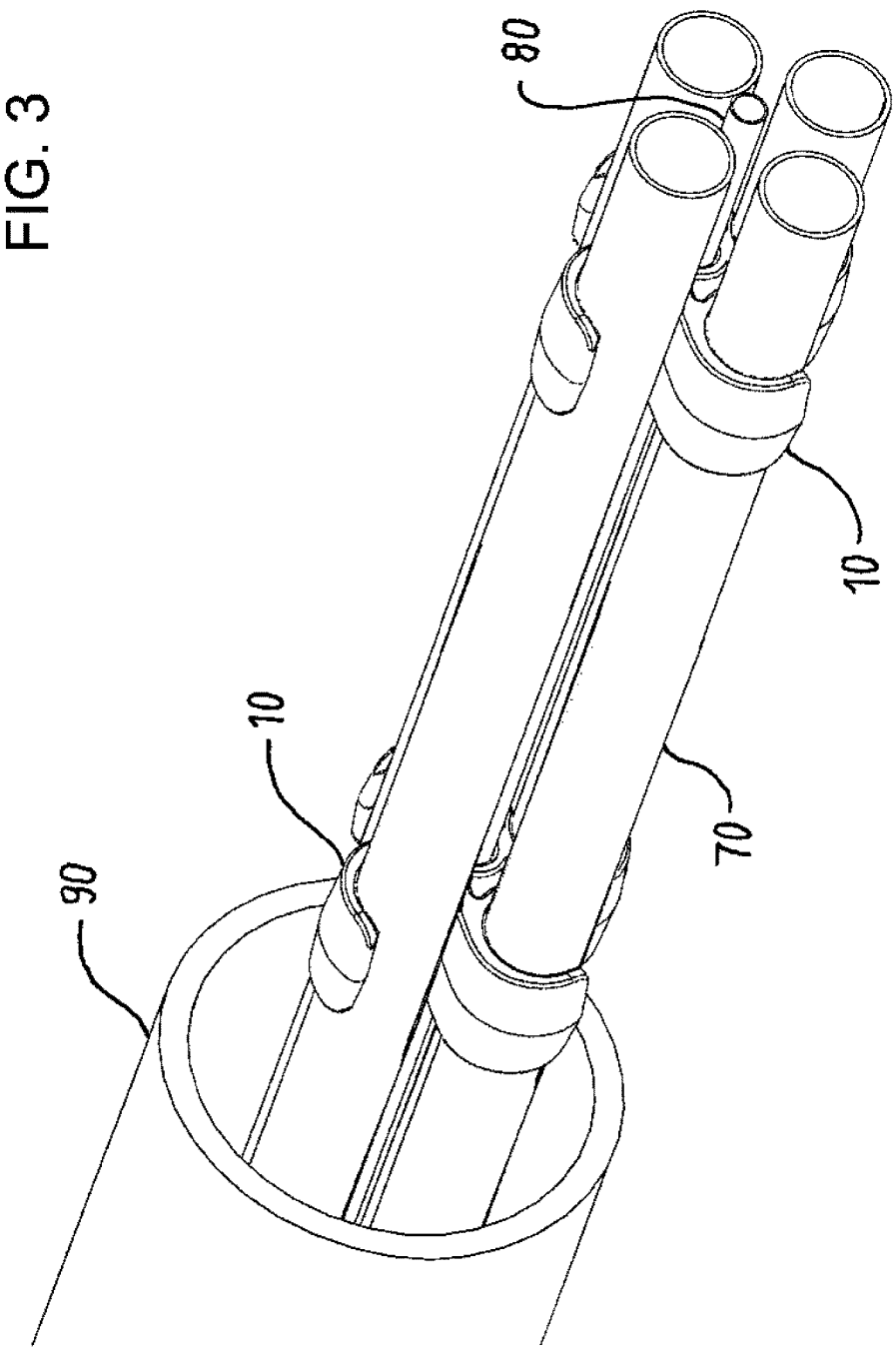
FIG. 3 is a perspective view of two cable guides, four large diameter cables, and one medium diameter cable as they are about to be pulled into a conduit.

The use of the cable guide can now be considered. Referring now to FIGS. 3 and 4, up to four relatively large diameter cables 70 are arranged in parallel and laterally inserted into the four sleeves. The resiliency of the sleeves enables them to move slightly to accommodate the cables as they are inserted. The sleeves then return to position to hold the cables securely. The center opening is used for one or more smaller diameter cables or wires of the type commonly used for control or grounding purposes. In FIGS. 3 and 4, a medium diameter cable 80 is shown in the center opening. It is held in place by large diameter cable 70 in sleeve 20.

Figure 9:
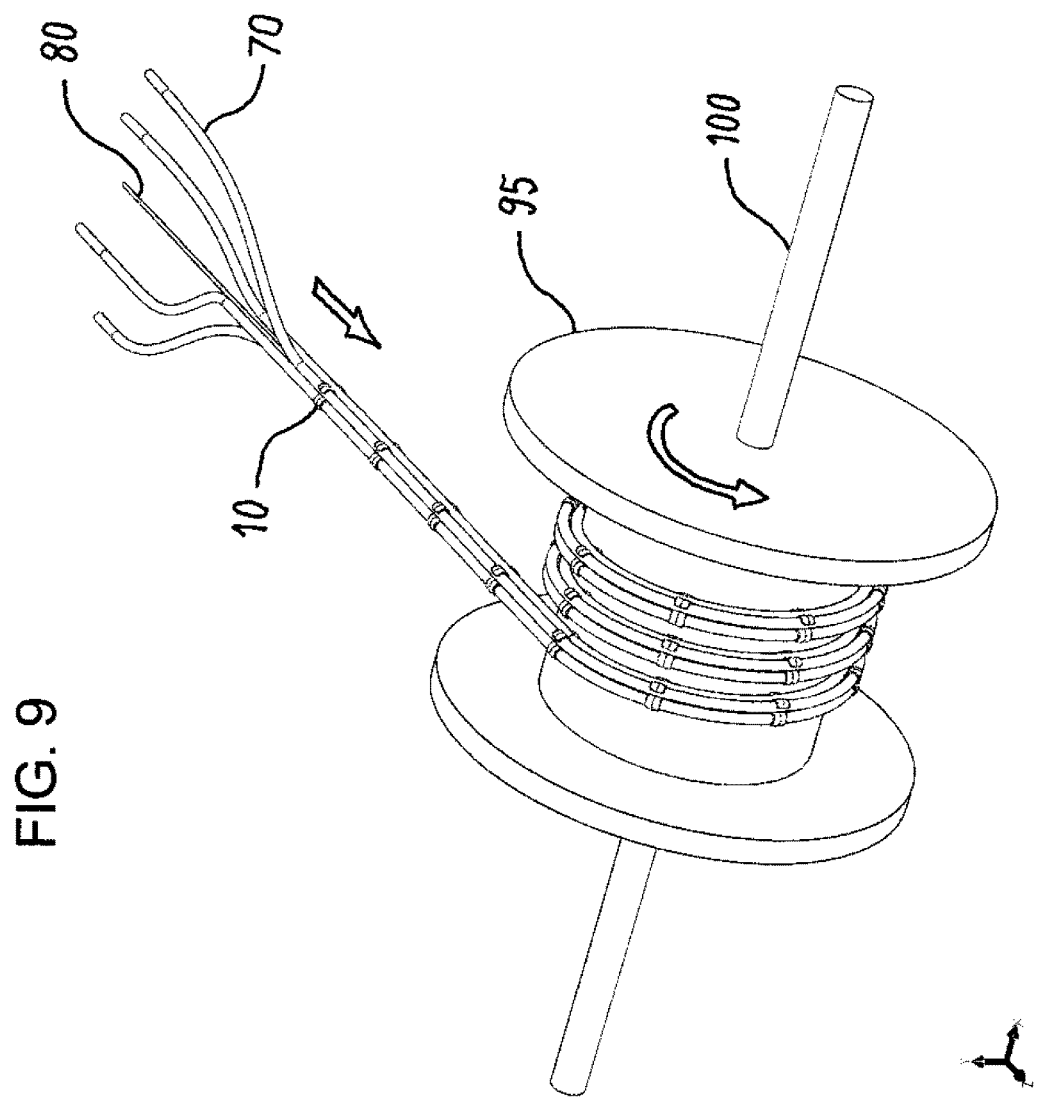
FIG. 9 is a perspective view showing the cable guides being installed on cables as they are being spooled.

The cable guides are generally placed onto the cables at one of two times. The most common time is as the cables are being pulled into a conduit 90 as illustrated in FIG. 3. An alternative time is as the cables are being placed onto a spool 95 rotating on a shaft 100 at the place of manufacture as illustrated in FIG. 9. The large arrows represent the direction of movement of the cables and the direction of rotation of the spool. An advantage of placing the cable guides on the cables as they are spooled is that this can be done very efficiently and automatically at the place of manufacture, thus eliminating the need for an electrician to place the cable guides on the cables at the place of installation.

Additional cable guides are placed on the cables at the desired spacings. In FIG. 3, two cable guides are shown attached to the cables. The optimal spacing of the cable guides depends on many factors, including cable size, number of cables, conduit size, conduit material, and conduit path (including length and bends). The cable guides are generally spaced about six inches to ten feet apart and preferably about one to three feet apart.

3. Alternate Embodiments

A second preferred embodiment 110 of the cable guide is shown in FIGS. 5 to 8. This alternate embodiment differs from the preferred embodiment in that sleeve 140 has a lengthwise opening that is considerably smaller than the lengthwise openings of the other three sleeves. This embodiment of the cable guide is useful when only three large diameter cables are to be pulled through a conduit. The sleeve with the smaller lengthwise opening is then well suited to accommodate smaller diameter control wires. If desired, a pivoting latch, clip, or the like is added to the smaller lengthwise opening to ensure that the smaller diameter wires remain inside the sleeve. However, such moving parts may be prone to failure, especially if the cable guide is reused many times.

Figure 7:
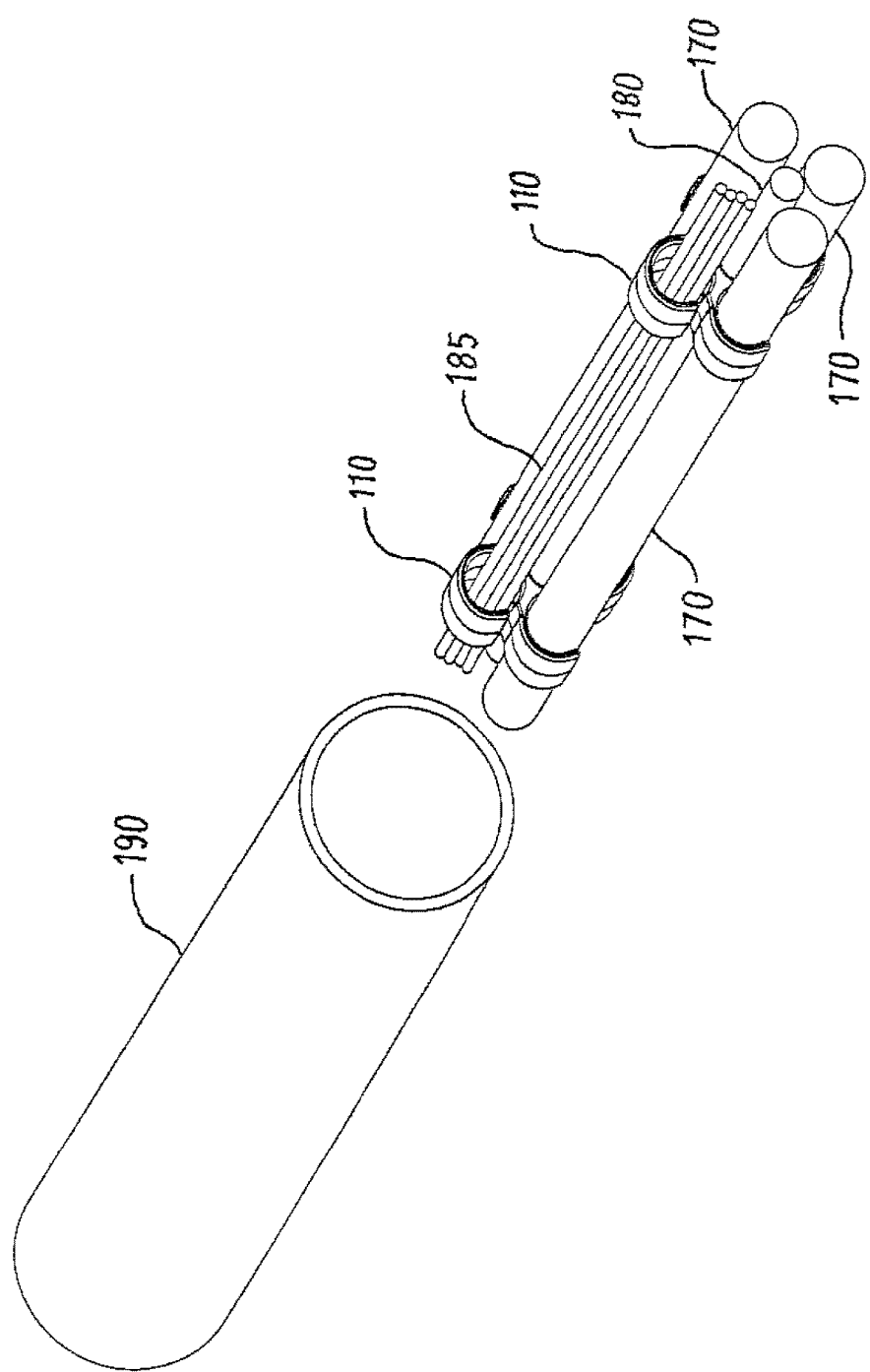
FIG. 7 is a perspective view of two cable guides, three large diameter cables, one medium diameter cable, and four small diameter cables as they are about to be pulled into a conduit.

In FIGS. 7 and 8, the second embodiment of the cable guide is shown in use with conduit 190. The cable guide has three relatively large, equal diameter cables 170 in sleeves 120, 130, and 150, one medium diameter cable 180 in the center opening 160, and four small diameter control wires 185 in sleeve 140.

While the two preferred embodiments have four sleeves, the number of sleeves can be varied from two to five or more.

4. Advantages

The cables with spaced apart cable guides are much easier to pull through a conduit than the cables by themselves for several reasons. First, the cable guides keep the cables parallel and prevent them for wrapping around each other. Second, the cable guides reduce the friction between the cables and the inner wall of the conduit. As a result, soaping or otherwise lubricating the cables is not necessary. These same features make removal of the cables easier if repair, modification, or removal is needed after installation.

Another benefit of the cable guides is that they maintain space between the cables and thus provide additional heat dissipation. By reducing heat for a given electrical load, the use of the cable guide allows smaller diameter cables to be safely used with a resulting savings in cost. The cable guides are easy to use, inexpensive, durable, and reusable.

The cable guides have no moving parts to wear out, are easily and quickly attached to cables, are easily and inexpensively manufactured, and are reusable.

I claim:

1. A cable guide comprising a plurality of outwardly extending, curved, resilient vanes having a thickness that is substantially uniform, the vanes being connected together at their proximate ends to form a plurality of outer cylindrical sleeves, each sleeve defining a longitudinal axis and having open ends and a lengthwise lateral opening of an arc of about 10 to 150 degrees extending between the open ends and running parallel to the longitudinal axis of the sleeve, the sleeves being adapted to receive and hold electrically conducting cables and a centrally located inner sleeve having open ends and a lengthwise lateral opening that communicates with one of the outer sleeves.

2. The cable guide of claim 1 wherein the sleeves are radially distributed about a center axis of the cable guide.

3. The cable guide of claim 2 wherein the cable guide comprises four parallel cylindrical sleeves.

4. The cable guide of claim 3 wherein each vane comprises an outer surface with an outwardly extending ridge running transverse to the longitudinal axis of the sleeve.

5. A process for installing electrically conducting cables in a conduit, the process comprising placing a plurality of the cable guides at spaced apart intervals onto a plurality of cables as or before the cables are pulled into a conduit, each cable guide having the general shape of an open impeller for a centrifugal pump and comprising a plurality of outwardly extending, curved, resilient vanes, the vanes being connected together at their proximate ends to form a plurality of outer cylindrical sleeves, each sleeve defining a longitudinal axis and having open ends and a lengthwise lateral opening of an arc of about 10 to 150 degrees extending between the open ends and running parallel to the longitudinal axis of the sleeve.

6. The process of claim 5 wherein the sleeves of each cable guide are radially distributed about a center axis of the cable guide.

7. The process of claim 6 wherein each cable guide comprises four parallel cylindrical sleeves.

8. The process of claim 7 wherein each cable guide additionally comprises a centrally located inner sleeve having open ends and a lengthwise lateral opening that communicates with one of the outer sleeves.

9. The process of claim 8 wherein each vane of each cable guide comprises an outer surface with an outwardly extending ridge running transverse to the longitudinal axis of the sleeve.

10. A process for placing electrically conducting cables on a spool, the process comprising placing a plurality of the cable guides at spaced apart intervals onto a plurality of cables as the cables are being placed onto a spool, each cable guide having the general shape of an open impeller for a centrifugal pump and comprising a plurality of outwardly extending, curved, resilient vanes having a thickness that is substantially uniform, the vanes being connected together at their proximate ends to form a plurality of outer cylindrical sleeves, each sleeve defining a longitudinal axis and having open ends and a lengthwise lateral opening of an arc of about 10 to 150 degrees extending between the open ends and running parallel to the longitudinal axis of the sleeve.

11. The process of claim 10 wherein the sleeves of each cable guide are radially distributed about a center axis of the cable guide.

12. The process of claim 11 wherein each cable guide comprises four parallel cylindrical sleeves.

13. The process of claim 12 wherein each cable guide additionally comprises a centrally located inner sleeve having open ends and a lengthwise lateral opening that communicates with one of the outer sleeves.

14. The process of claim 13 wherein each vane of each cable guide comprises an outer surface with an outwardly extending ridge running transverse to the longitudinal axis of the sleeve.

* * * * *